US009092114B2

(12) United States Patent
Nelson et al.

(10) Patent No.: US 9,092,114 B2
(45) Date of Patent: *Jul. 28, 2015

(54) EFFECTUATING MODIFICATIONS WITHIN AN INSTANCE OF A VIRTUAL SPACE PRESENTED VIA MULTIPLE DISPARATE CLIENT COMPUTING PLATFORMS RESPONSIVE TO DETECTION OF A TOKEN ASSOCIATED WITH A SINGLE CLIENT COMPUTING PLATFORM

(71) Applicant: Disney Enterprises, Inc., Burbank, CA (US)

(72) Inventors: Robert Nelson, Salt Lake City, UT (US); Justin Towns, Draper, UT (US); Kirk Baum, American Fork, UT (US); Robert Zobell, North Salt Lake, UT (US); Terry Penn, Salt Lake City, UT (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,512

(22) Filed: Oct. 14, 2014

(65) Prior Publication Data

US 2015/0033154 A1 Jan. 29, 2015

Related U.S. Application Data

(63) Continuation of application No. 13/838,060, filed on Mar. 15, 2013, now Pat. No. 8,904,298.

(51) Int. Cl.
*G06F 3/048* (2013.01)
*G06F 3/0481* (2013.01)
(Continued)

(52) U.S. Cl.
CPC ............ *G06F 3/04815* (2013.01); *A63F 13/10* (2013.01); *A63F 13/12* (2013.01); *G06F 3/04847* (2013.01); *H04L 67/10* (2013.01); *A63F 2300/5553* (2013.01); *A63F 2300/609* (2013.01)

(58) Field of Classification Search
CPC . G06F 3/04815; G06F 3/04847; A63F 13/10; A63F 13/12; A63F 2300/5553; A63F 2300/609; H04L 67/10
USPC ........ 715/757, 826, 854; 713/159; 463/32, 43
See application file for complete search history.

(56) References Cited

U.S. PATENT DOCUMENTS

| 5,190,285 A | 3/1993 | Levy et al. ................... 273/85 G |
| 5,766,077 A | 6/1998 | Hongo ............................ 463/30 |

(Continued)

FOREIGN PATENT DOCUMENTS

| GB | 2 365 364 | 2/2002 |
| WO | WO 01/69572 | 9/2001 |

(Continued)

OTHER PUBLICATIONS

U.S. Appl. No. 60/151,586, filed Aug. 30, 1999 in the name of Tony Forrest Rodriguez, 4 pages.

(Continued)

*Primary Examiner* — Eleni Shiferaw
*Assistant Examiner* — Gregory M Elmore
(74) *Attorney, Agent, or Firm* — Pillsbury Winthrop Shaw Pittman LLP (57) ABSTRACT

Exemplary implementations may facilitate effectuating modifications within an instance of a virtual space presented via multiple disparate client computing platforms responsive to detection of a token associated with a single client computing platform. In some implementations, tokens may be detected based on signals received from token readers associated with individual ones of the multiple client computing platforms. A given token may be a standalone physical object. The given token may be detectable based on a signal conveying information associated with the given token. The information associated with the given token conveyed by the signal may be devoid of virtual space content.

16 Claims, 2 Drawing Sheets

(51) Int. Cl.
  *A63F 13/40* (2014.01)
  *A63F 13/30* (2014.01)
  *G06F 3/0484* (2013.01)
  *H04L 29/08* (2006.01)

(56) References Cited

U.S. PATENT DOCUMENTS

| | | | |
|---|---|---|---|
| 5,853,327 A | 12/1998 | Gilboa | 463/39 |
| 5,855,483 A | 1/1999 | Collins et al. | 434/322 |
| 6,354,947 B1 | 3/2002 | Dobrusskin et al. | 463/43 |
| 6,361,396 B1 | 3/2002 | Snyder et al. | 446/397 |
| 6,364,735 B1 | 4/2002 | Bristow et al. | 446/397 |
| 6,650,870 B2 | 11/2003 | White et al. | 455/41 |
| 6,735,324 B1 | 5/2004 | McKinley et al. | 382/100 |
| 6,761,637 B2 | 7/2004 | Weston et al. | 463/42 |
| 6,773,325 B1 | 8/2004 | Mawle et al. | 446/175 |
| 6,835,131 B1 | 12/2004 | White et al. | 463/1 |
| 6,877,096 B1 | 4/2005 | Chung et al. | 713/185 |
| 6,967,566 B2 | 11/2005 | Weston et al. | 340/323 R |
| 7,001,276 B2 | 2/2006 | Shinoda | 463/25 |
| 7,066,781 B2 | 6/2006 | Weston | 446/268 |
| 7,081,033 B1 | 7/2006 | Mawle et al. | 446/175 |
| 7,244,183 B1 | 7/2007 | England | 463/48 |
| 7,297,063 B2 | 11/2007 | Fujisawa et al. | 463/43 |
| D559,327 S | 1/2008 | Luk et al. | D21/332 |
| 7,338,377 B2 | 3/2008 | Shinoda | 463/47 |
| 7,426,642 B2 | 9/2008 | Aupperle et al. | 713/185 |
| 7,488,231 B2 | 2/2009 | Weston | 446/175 |
| 7,502,759 B2 | 3/2009 | Hannigan et al. | 705/51 |
| 7,534,157 B2* | 5/2009 | Ganz | 446/175 |
| 7,636,783 B2 | 12/2009 | Heutchy et al. | 709/227 |
| 7,677,948 B2 | 3/2010 | Ganz | 446/175 |
| D620,256 S | 7/2010 | Fujimura et al. | D3/294 |
| D620,257 S | 7/2010 | Fujimura et al. | D3/294 |
| 7,789,726 B2 | 9/2010 | Ganz | 446/175 |
| D626,978 S | 11/2010 | Huh | D15/126 |
| 7,843,334 B2 | 11/2010 | Kumagai et al. | 340/539.13 |
| 7,843,471 B2 | 11/2010 | Doan et al. | 345/633 |
| 7,846,004 B2 | 12/2010 | Ganz | 446/175 |
| 7,883,416 B2 | 2/2011 | Dobrusskin et al. | 463/37 |
| 7,883,420 B2 | 2/2011 | Bradbury et al. | 463/43 |
| 7,886,156 B2 | 2/2011 | Franchi | 713/186 |
| 7,905,779 B2 | 3/2011 | Dyke et al. | 463/30 |
| 7,933,968 B1* | 4/2011 | Zimmerman | 709/217 |
| 8,002,605 B2 | 8/2011 | Ganz | 446/175 |
| D645,910 S | 9/2011 | Foster et al. | D21/333 |
| 8,025,573 B2 | 9/2011 | Stenton et al. | 463/43 |
| 8,033,901 B2 | 10/2011 | Wood | 463/1 |
| D657,426 S | 4/2012 | Gomez | D21/330 |
| D666,249 S | 8/2012 | Minchella Jennings et al. | D21/333 |
| 8,323,068 B2 | 12/2012 | Ganetakos et al. | 446/175 |
| 8,401,913 B2 | 3/2013 | Alivandi | 705/26.1 |
| D680,594 S | 4/2013 | Mercier et al. | D21/330 |
| D687,106 S | 7/2013 | Menting | D21/398 |
| 8,726,172 B1 | 5/2014 | Vignocchi et al. | 715/757 |
| D710,945 S | 8/2014 | Biheller et al. | D21/333 |
| 8,864,589 B2 | 10/2014 | Reiche, III | 463/44 |
| 8,904,298 B2 | 12/2014 | Nelson et al. | 715/757 |
| 8,909,920 B2 | 12/2014 | Vignocchi et al. | 713/159 |
| 8,910,266 B2 | 12/2014 | Vignocchi et al. | 726/9 |
| 2003/0037075 A1 | 2/2003 | Hannigan et al. | 707/500 |
| 2004/0029625 A1 | 2/2004 | Annunziata | 463/1 |
| 2004/0092311 A1 | 5/2004 | Weston et al. | 463/42 |
| 2004/0266505 A1 | 12/2004 | Keam et al. | 463/1 |
| 2005/0245302 A1 | 11/2005 | Bathiche et al. | 463/1 |
| 2006/0009287 A1 | 1/2006 | Engelfriet | 463/35 |
| 2006/0094501 A1 | 5/2006 | O'Leary et al. | 463/30 |
| 2007/0015588 A1 | 1/2007 | Matsumoto et al. | 463/43 |
| 2007/0087839 A1 | 4/2007 | Bradbury et al. | 463/43 |
| 2007/0197297 A1 | 8/2007 | Witchey | 463/42 |
| 2007/0211047 A1 | 9/2007 | Doan et al. | 345/419 |
| 2008/0085773 A1 | 4/2008 | Wood | 463/43 |
| 2008/0161113 A1* | 7/2008 | Hansen et al. | 463/42 |
| 2008/0280684 A1 | 11/2008 | McBride et al. | 463/42 |
| 2008/0300053 A1 | 12/2008 | Muller | 463/31 |
| 2009/0002377 A1 | 1/2009 | Lee et al. | 345/473 |
| 2009/0023487 A1 | 1/2009 | Gilson et al. | 463/11 |
| 2009/0053970 A1 | 2/2009 | Borge | 446/268 |
| 2009/0137323 A1 | 5/2009 | Fiegener et al. | 463/43 |
| 2009/0197658 A1 | 8/2009 | Polchin | 463/9 |
| 2009/0203446 A1 | 8/2009 | Bradbury et al. | 463/40 |
| 2009/0291764 A1 | 11/2009 | Kirkman et al. | 463/43 |
| 2009/0307611 A1* | 12/2009 | Riley | 715/757 |
| 2010/0023492 A1 | 1/2010 | Lucas | 707/3 |
| 2010/0151940 A1 | 6/2010 | Borge | 463/29 |
| 2011/0045913 A1 | 2/2011 | Walker et al. | 463/42 |
| 2011/0107239 A1 | 5/2011 | Adoni et al. | 715/757 |
| 2011/0231781 A1 | 9/2011 | Betzler et al. | 715/757 |
| 2011/0250954 A1 | 10/2011 | Braund | 463/29 |
| 2011/0263322 A1 | 10/2011 | Van Luchene | 463/29 |
| 2011/0263332 A1 | 10/2011 | Mizrachi | 463/42 |
| 2011/0288914 A1 | 11/2011 | Guthrie | 705/14.4 |
| 2011/0294574 A1 | 12/2011 | Yamada et al. | 463/30 |
| 2012/0015748 A1 | 1/2012 | Osada | 463/43 |
| 2012/0064968 A1 | 3/2012 | Youm et al. | 463/29 |
| 2012/0142429 A1 | 6/2012 | Muller | 463/42 |
| 2012/0172131 A1 | 7/2012 | Boswell et al. | 463/42 |
| 2012/0238362 A1 | 9/2012 | Janis et al. | 463/31 |
| 2012/0295702 A1 | 11/2012 | Otero et al. | 463/31 |
| 2012/0295703 A1* | 11/2012 | Reiche et al. | 463/31 |
| 2012/0295704 A1 | 11/2012 | Reiche et al. | 463/31 |
| 2012/0302356 A1 | 11/2012 | Annunziata | 463/42 |
| 2012/0311688 A1 | 12/2012 | Lemus et al. | 726/8 |
| 2012/0315983 A1 | 12/2012 | Miller, IV et al. | 463/29 |
| 2012/0331529 A1 | 12/2012 | Ibel et al. | 726/4 |
| 2013/0079132 A1* | 3/2013 | Archer et al. | 463/31 |
| 2013/0290137 A1 | 10/2013 | Olomskiy | 405/26.41 |
| 2013/0290417 A1 | 10/2013 | Chandra et al. | 705/27.1 |
| 2013/0296043 A1 | 11/2013 | Weinshanker et al. | 463/30 |
| 2014/0066209 A1 | 3/2014 | Annambhotla | 463/42 |
| 2014/0176534 A1 | 6/2014 | Vignocchi et al. | 345/419 |
| 2014/0179418 A1 | 6/2014 | Vignocchi et al. | 463/29 |
| 2014/0179443 A1 | 6/2014 | Vignocchi et al. | 463/43 |
| 2014/0179444 A1 | 6/2014 | Vignocchi et al. | 463/43 |
| 2014/0181062 A1 | 6/2014 | Vignocchi et al. | 707/705 |
| 2014/0181507 A1 | 6/2014 | Vignocchi et al. | 713/159 |
| 2014/0181706 A1 | 6/2014 | Vignocchi | 715/764 |
| 2014/0181820 A1 | 6/2014 | Vignocchi et al. | 718/100 |
| 2014/0181994 A1 | 6/2014 | Vignocchi et al. | 726/28 |
| 2014/0223534 A1 | 8/2014 | Vignocchi et al. | 726/9 |
| 2014/0304624 A1 | 10/2014 | Nelson et al. | 715/757 |

FOREIGN PATENT DOCUMENTS

| | | |
|---|---|---|
| WO | WO 01/69830 | 9/2001 |
| WO | WO 03/043709 | 5/2003 |
| WO | WO 2007/101785 | 9/2007 |

OTHER PUBLICATIONS

U.S. Appl. No. 60/288,272, filed May 2, 2001 in the name of Ravi K. Sharma et al., 31 pages.
U.S. Appl. No. 60/297,229, filed Jun. 7, 2001 in the name of Brett T. Hannigan et al., 46 pages.
U.S. Appl. No. 60/335,908, filed Nov. 14, 2001 in the name of Stephen C. Beck, 120 pages.
U.S. Appl. No. 60/355,856, filed Feb. 10, 2002 in the name of Brett T. Hannigan et al., 53 pages.
Varney, Allen et al., "Paranoia XP", Mongoose Publishing, Dec. 31, 2004, ISBN: 978-1-904854-26-5, retrieved from the Internet: URL:http://fc09.deviantart.net/fs71/f/2012/316/e/6/paranoia_player_section_by_atta_crossroads-d4zxv52.pdf, retrieved Apr. 16, 2014, 110 pages.
Diablo III, Wikipedia.org, online, accessed via the Internet, accessed Jun. 26, 2014, URL: <http://en.wikipedia.org/wiki/Diablo_III>, 25 pages.
Stash, Diablowiki.net, online, accessed via the Internet, accessed Jun. 26, 2014, URL: <http://www.diablowiki.net/Stash>, 7 pages.
Gear Sets, Diablowiki.net, online, accessed via the Internet, accessed Jun. 26, 2014, URL: <http://www.diablowiki.net/Gear_sets>, 8 pages.

(56) References Cited

OTHER PUBLICATIONS

Weapons, Diablowiki.net, online, accessed via the Internet, accessed Jun. 26, 2014, URL: <http://www.diablowiki.net/Weapons>, 7 pages.

Fundamentals, Battle.net, online, accessed via the Internet, accessed Jun. 26, 2014, URL: <http://us.battle.net/d3/en/game/guide/gameplay/fundamentals>, 13 pages.

Inventory, Battlet.net, online, accessed via the Internet, accessed Jun. 26, 2014, URL: <http://us.battle.net/d3/en/game/guide/items/inventory>, 9 pages.

Toy Story 3: The Video Game, Wikipedia.org, online, accessed via the Internet, accessed Jun. 26, 2014, URL: <http:/en.wikipedia.org/wiki/Toy_Story_3:_The_Video_Game>, 10 pages.

Toy Story 3 Toy Box Mode Demo, Youtube.com, online, May 8, 2010, accessed via the Internet, accessed Jun. 26, 2014, URL: <http://www.youtube.com/watch?v=Do84qnpfUvQ>, 2 pages.

Crecente, Brian, "Diving Into Toy Story 3's Toy Box", Kotaku.com, online, May 20, 2010, accessed via the Internet, accessed Jun. 26, 2014, URL: <http://kotaku.com/5543513/diving-into-toy-story-3s-toy-box>, 4 pages.

Whitehead, Dan, "Toy Story 3 Page 2", Eurogamer.net, online, Jul. 14, 2010, accessed via the Internet, accessed Jun. 26, 2014, URL: <http://www.eurogamer.net/articles/toy-story-3-review?page=2>, 2 pages.

[Guide] Item Drops That Starts Quest [LvL 1-85 Zones]. Eu.battle.net. Online. Dec. 31, 2010. Accessed via the Internet. Accessed Nov. 13, 2014. <URL:http://eu.battle.net/wow/en/forum/topic/1415204550>, 18 pages.

Blood Elf Plans. Eu.battle.net. Online. Accessed via the Internet. Accessed Nov. 13, 2014. <URL:http://eu.battle.net/wow/en/item/24414>, 2 pages.

* cited by examiner

EFFECTUATING MODIFICATIONS WITHIN AN INSTANCE OF A VIRTUAL SPACE PRESENTED VIA MULTIPLE DISPARATE CLIENT COMPUTING PLATFORMS RESPONSIVE TO DETECTION OF A TOKEN ASSOCIATED WITH A SINGLE CLIENT COMPUTING PLATFORM

CROSS REFERENCE TO RELATED APPLICATIONS

The present application is a continuation of U.S. patent application Ser. No. 13/838,060, filed Mar. 15, 2013, entitled "Effectuating Modifications Within An Instance Of A Virtual Space Presented Via Multiple Disparate Client Computing Platforms Responsive To Detection Of A Token Associated With A Single Client Computing Platform", the disclosure of which is incorporated herein by reference in its entirety.

FIELD OF THE DISCLOSURE

This disclosure relates to effectuating modifications within an instance of a virtual space presented via multiple disparate client computing platforms responsive to detection of a token associated with a single client computing platform.

BACKGROUND

Conventionally, modifications within an instance of a virtual space may be limited to modifications made in response to in-space actions. For example, a user may select from an in-space menu providing available modification options. As another example, modifications may be made in response to actions performed by a character in a virtual space.

SUMMARY

One aspect of the disclosure relates to a system configured to effectuate modifications within an instance of a virtual space presented via multiple disparate client computing platforms responsive to detection of a token associated with a single client computing platform, in accordance with one or more implementations. Exemplary implementations may facilitate effectuating modifications within an instance of a virtual space presented via multiple disparate client computing platforms responsive to detection of a token associated with a single client computing platform. In some implementations, a physical accessory may depict a character in the virtual space. By way of non-limiting example, the physical accessory may include a toy figurine resembling the character. A detectable token (i.e., a physical object) may be removably attached to the physical accessory. According to some implementations, responsive to the physical accessory being detected along with the removably attached token, a modification within the virtual space may be effectuated. In some implementations, detection of the token alone may effectuate such a modification.

The system may include one or more virtual space platforms. A token may be configured to be detected to effectuate modifications within an instance of the virtual space, in accordance with one or more implementations. The token may be configured to be detectable by a token reader. According to some implementations, token reader may be a peripheral device configured to be communicatively coupled with one or more components of the system.

The virtual space platform(s) may be configured to execute one or more computer program modules. The computer program modules may include one or more of a user module, a space module, a token detection module, a virtual space modification module, and/or other modules. The user module may be configured to access and/or manage one or more user profiles and/or user information associated with users of the system. The space module may be configured to implement the instance of the virtual space executed by the computer modules to determine views of the virtual space.

The token detection module may be configured to detect tokens based on signals received from token readers associated with individual ones of the client computing platforms. For example, a first token may be associated with a first client computing platform, whereas a second token may be associated with a second client computing platform. Detecting the token may include receiving a signal conveying information associated with the token. Such information may be utilized to identify the token, a character associated with the token, a virtual item associated with the token, and/or other information associated with the token.

The virtual space modification module may be configured to effectuate a first modification within the instance of the virtual space responsive to detection of the first token. The first modification may be observable via multiple ones of the client computing platforms. The observability of the first modification via the multiple ones of the client computing platforms may occur immediately upon detection of the first token, or at a later time. The first modification may include one or more of (1) a modification to a first character within the virtual space, (2) a modification to a first virtual item within the virtual space, (3) a modification to one or more aspects of the virtual space, and/or other modifications.

A character (e.g., the first character) may be a user-controlled character or a non-user-controlled character. A modification to the character may include a modification to one or more of a behavior of the character, an ability of the character, an appearance of the character, a relationship of the character, and/or other modifications associated with the character. A modification to a virtual item (e.g., the first virtual item) may include a modification to one or more of a function of the virtual item, an effectiveness of the virtual item, an appearance of the virtual item, and/or other modifications associated with the virtual item. A given objective may be a purpose or goal that efforts or actions within the virtual space are intended to attain or accomplish. The environment of the virtual space may be an aggregate of surroundings and conditions of the virtual space. The theme of the virtual space may be a unifying subject associated with the virtual space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Exemplary implementations may facilitate effectuating modifications within an instance of a virtual space presented via multiple disparate client computing platforms responsive to detection of a token associated with a single client computing platform. In some implementations, a physical accessory may depict a character in the virtual space. By way of non-limiting example, the physical accessory may include a toy figurine resembling the character. A detectable token (i.e., a physical object) may be removably attached to the physical accessory. According to some implementations, responsive to the physical accessory being detected along with the removably attached token, a modification within the virtual space may be effectuated. In some implementations, detection of the token alone may effectuate such a modification.

Figure 1:
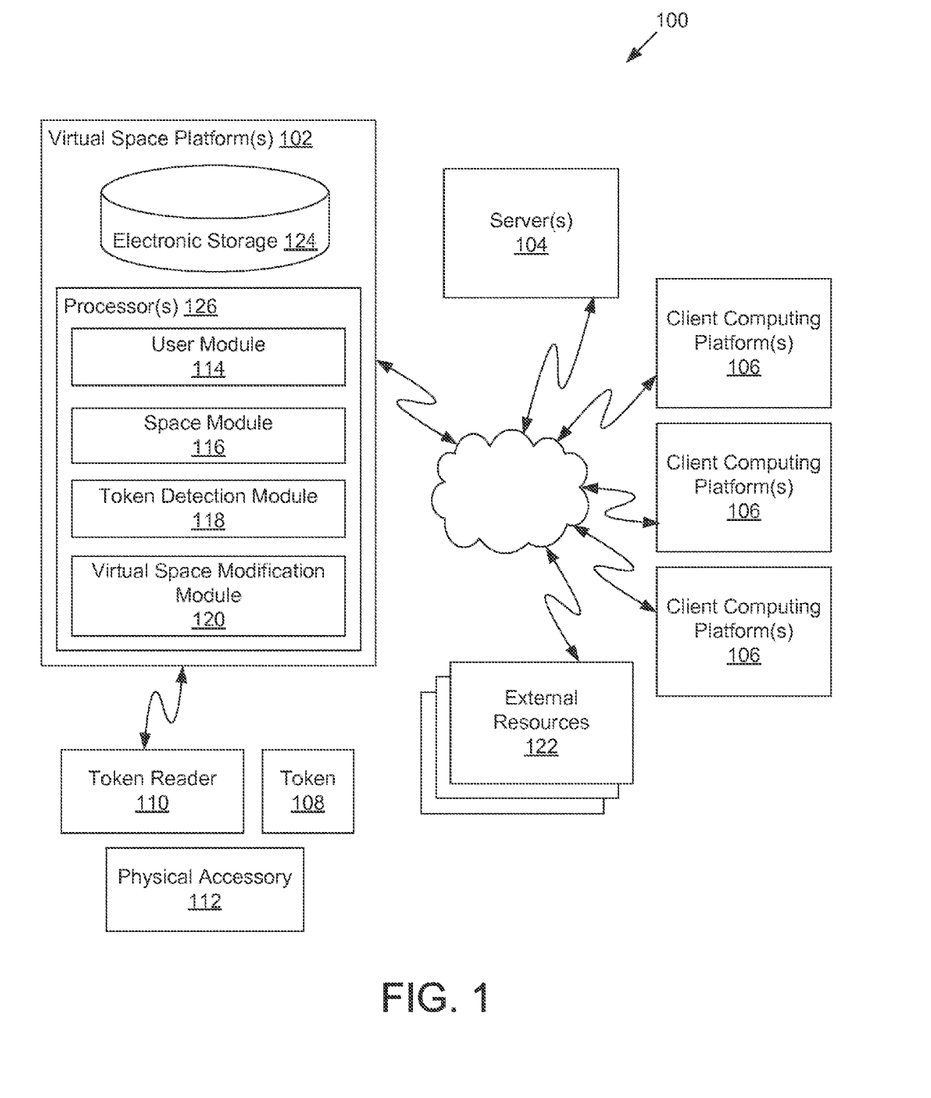
FIG. 1 illustrates a system configured to effectuate modifications within an instance of a virtual space presented via multiple disparate client computing platforms responsive to detection of a token associated with a single client computing platform, in accordance with one or more implementations.

FIG. 1 illustrates a system configured to effectuate modifications within an instance of a virtual space presented via multiple disparate client computing platforms responsive to detection of a token associated with a single client computing platform, in accordance with one or more implementations. The system 100 may include one or more virtual space platforms 102. In some implementations, virtual space platform(s) 102 may be one or more servers (e.g., server(s) 104) configured to communicate with one or more client computing platform (e.g., client computing platforms 106) according to a client/server architecture. According to some implementations, virtual space platform(s) 102 may be one or more client computing platforms (e.g., client computing platforms 106). In some implementations, virtual space platform(s) 102 may communicate with other virtual space platform(s) 102 according to a peer-to-peer architecture. The users may access system 100 and/or the virtual space via the virtual space platform(s) 102 and/or client computing platform(s) 106.

A token 108 may be configured to be detected to effectuate modifications within an instance of the virtual space, in accordance with one or more implementations. The token 108 may be a standalone physical object. Examples of token 108 may include one or more of a toy figurine, a toy accessory, a coin, a disk, a card, and/or other form factors suitable to be tokens as described herein. The token 108 may be configured to depict a given character and/or a given virtual item. By way of non-limiting example, the given character may be Captain Jack Sparrow, the fictional character and protagonist of the Pirates of the Caribbean film series. The given virtual item may be an accessory associated with Captain Jack Sparrow, such as a sword. The token 108 may be a toy figurine embodying the appearance of Captain Jack Sparrow and/or the sword. The token 108 may include an image of Captain Jack Sparrow and/or the sword. The token 108 may include an emblem associated with Captain Jack Sparrow and/or the sword.

The token 108 may be configured to be detectable by a token reader 110. In some implementations, detection of token 108 may be based on a shape of a portion of token 108 and/or an overall shape of token 108. In some implementations, token 108 may be detectable based on a signal conveying information associated with token 108. The information associated with token 108 conveyed by the signal may be devoid of virtual space content (described further herein). Detection of token 108 may be facilitated by electronics embedded within or otherwise included in token 108. For example, token 108 may include a radio-frequency identification (RFID) chip configured to emit radio-frequency electromagnetic fields responsive to token 108 being disposed in a proximity of token reader 110. As another example, token 108 may include an integrated circuit configured to transfer information associated with token 108 responsive to token 108 being placed in contact with a portion of token reader 110.

According to some implementations, virtual space content associated with one or more of a character, a virtual item, the virtual space, a modification to the character, a modification to the virtual item, a modification to the virtual space, and/or other virtual space content may be stored at a location other than token 108. That is, token 108 may not store virtual space content. The token 108 may store information used to detect token 108. In some implementations, token 108 may not store information other than what may be used to detect the given token. Virtual space content may include information used to affect views and/or gameplay of the virtual space. Such virtual space content may be stored by virtual space platform(s) and/or by one or more other components of the system described in connection with FIG. 1.

The physical accessory 112 may be a standalone physical object. Examples of physical accessory 112 may include one or more of a toy figurine, a toy accessory, a coin, a card, and/or other form factors suitable to be a physical accessory as described herein. The physical accessory 112 may be configured to depict one or both of a character and/or a virtual item. By way of non-limiting example, a given character may be Buzz Lightyear, the fictional character and deuteragonist of the Toy Story film series. A given virtual item may be the handheld "Blaster" used by Buzz Lightyear in the Toy Story film series.

In some implementations, physical accessory 112 may itself be a token that is the same as or similar to token 108. For example, physical accessory 112 may be detectable.

The token 108 may be configured to be removably attached to physical accessory 112. In some implementations, token 108 must be attached to physical accessory 112 for the modification to one or more of a character, a virtual item, and/or one or more aspects of the virtual space to be effectuated. By way of non-limiting illustration, token 108 may be removably attached to a bottom surface of physical accessory 112. Responsive to token 108 and physical accessory 112 being detected together, a modification may be made to one or both of (1) the character depicted by physical accessory 112 or (2) a virtual item associated with the character depicted by physical accessory 112. As another example, where physical accessory 112 depicts Captain Jack Sparrow and token 108 depicts the Blaster of Buzz Lightyear, detection of token 108 and physical accessory 112 may effectuate a modification of Captain Jack Sparrow's sword such that the sword takes on some characteristics of the Blaster (e.g., shooting laser beams).

The token reader 110 may be configured to detect token 108. The token reader 110 may be configured to provide signals associated with individual tokens (e.g., token 108). For example, a given signal associated with a given token may convey information associated with the given token. In some implementations, token reader 110 may be configured to provide a first signal responsive to one or more of (1) a first token abutting a portion of the token reader, (2) the first token being disposed in a proximity of the token reader, and/or other actions configured to facilitate detection of the first token. In some implementations, token 108 may be configured to be removably attached to a surface of token reader 110.

According to some implementations, token reader 110 may be a peripheral device configured to be communicatively coupled with one or more components of the system described in connection with FIG. 1. In some implementations, token reader 110 may be integrated so as to form a singular device with a component of the system described in connection with FIG. 1.

The virtual space platform(s) 102 may be configured to execute one or more computer program modules. The computer program modules may include one or more of a user module 114, a space module 116, a token detection module 118, a virtual space modification module 120, and/or other modules.

The user module 114 may be configured to access and/or manage one or more user profiles and/or user information associated with users of system 100. The one or more user profiles and/or user information may include information stored by virtual space platform(s) 102 and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 116 may be configured to implement the instance of the virtual space executed by the computer modules to determine views of the virtual space. In some implementations, the views may then be communicated (e.g., via streaming, via object/position data, and/or other information) from server(s) 104 to client computing platform(s) 106 for presentation to users. The view determined and presented to a given user may correspond to a user character being controlled by the given user. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via virtual space platform(s) 102 and/or clients (e.g., client computing platform(s) 106) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 116 is not intended to be limiting. The space module 116 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 116, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through virtual space platform(s) 102 and/or clients (e.g., client computing platform(s) 106). The users may interact with each other through communications exchanged within the virtual space. Such communications may include one or more of textual chat, instant messages, private messages, voice communications, and/or other communications. Communications may be received and entered by the users via their respective virtual space platform(s) 102 and/or client(s) (e.g., client computing platform(s) 106). Communications may be routed to and from the appropriate users through virtual space platform(s) 102 (e.g., through space module 116).

The token detection module 118 may be configured to detect tokens (e.g., token 108) based on signals received from token readers (e.g., token reader 110) associated with individual ones of client computing platforms 106. For example, a first token may be associated with a first client computing platform, whereas a second token may be associated with a second client computing platform. Detecting token 108 may include receiving a signal conveying information associated with token 108. Such information may be utilized to identify token 108, a character associated with token 108, a virtual item associated with token 108, and/or other information associated with token 108.

The virtual space modification module 120 may be configured to effectuate a first modification within the instance of the virtual space responsive to detection of the first token (e.g., token 108). The first modification may be observable via multiple ones of client computing platforms 106. The observability of the first modification via the multiple ones of client computing platforms 106 may occur immediately upon detection of the first token, or at a later time. The first modification may include one or more of (1) a modification to a first character within the virtual space, (2) a modification to a first virtual item within the virtual space, (3) a modification to one or more aspects of the virtual space, and/or other modifications.

A character (e.g., the first character) may be a user-controlled character or a non-user-controlled character. A modification to the character may include a modification to one or more of a behavior of the character, an ability of the character, an appearance of the character, a relationship of the character, and/or other modifications associated with the character. By way of non-limiting example, a modification to a behavior of the character may include a modification to how the character acts when idle and/or other behavior modifications. A modification to an ability of the character may include a modification to a speed at which the character can run and/or other ability modifications. A modification to an ability of the character may include addition of abilities (e.g., flying). A modification to an appearance of the character may include a change to apparel worn by the character and/or other appearance modifications. A modification to a relationship of the character may include becoming friends with another character and/or other relationship modifications. In some implementations, a character modification may include introducing a new character to the instance of the virtual space.

A modification to a virtual item (e.g., the first virtual item) may include a modification to one or more of a function of the virtual item, an effectiveness of the virtual item, an appearance of the virtual item, and/or other modifications associated with the virtual item. By way of non-limiting example, a modification to a function of the virtual item may include extending a range of shots fired by the virtual item and/or other function modifications. A modification to a function of the virtual item may include addition of functions (e.g., shooting laser beams in addition to normal shots). A modification to an effectiveness of the virtual item may include decreasing the number of shots from the virtual item required to defeat a foe and/or other effectiveness modifications. A modification to the appearance of the virtual item may include a change to the color or size of the virtual item and/or other appearance modifications.

Aspects of the virtual space may include one or more of objectives associated with the virtual space, an environment of the virtual space, a theme of the virtual space, and/or other aspects of the virtual space. A given objective may be a purpose or goal that efforts or actions within the virtual space are intended to attain or accomplish. By way of non-limiting example, a modification to an objective may include a modification to a set of actions that must be performed by a user character in order to advance to a next level of gameplay in the virtual space.

The environment of the virtual space may be an aggregate of surroundings and conditions of the virtual space. By way on non-limiting example, a modification to the surroundings of the virtual space may include a modification to one or more of the appearance of the virtual space, a color scheme of the virtual space, a sound and/or soundtrack associated with the virtual space, and/or other aspects of the surroundings of the virtual space. A modification to the conditions of the virtual space may include a modification to one or more of laws of nature (e.g., gravity) of the virtual space, weather depicted in the virtual space, and/or other aspects of the conditions of the virtual space. Modifying the environment may include modifying one or both of the surroundings or the conditions of the virtual space.

The theme of the virtual space may be a unifying subject associated with the virtual space. A given character may be one of a plurality of characters associated with a given theme. By way of non-limiting example, where the character is Captain Jack Sparrow, the theme may relate to Pirates of the Caribbean. A modification to the theme of the virtual space may include a modification to one or more attributes of the theme of the virtual space. Examples of such attributes may include one or more of objects, designs, symbols, color schemes, music, and/or other attributes that identify the theme of the virtual space.

According to some implementations, detection of a token (e.g., token 108) associated with the first client computing platform in combination with detection of one or more other tokens associated with the first client computing platform may effectuate another modification within the instance of the virtual space. In some implementations, detection of both a first token associated with a first character and a second token associated with a second theme may effectuate a modification to the first character based on the second theme. By way of non-limiting example, where the first character is Captain Jack Sparrow and the second theme relates to the Toy Story film series, the first character may be modified such that Captain Jack Sparrow sings the theme song of Toy Story.

In some implementations, client computing platforms 106 may include a second client computing platform. The tokens may include a second token associated with the second client computing platform. The second token may be similar to token 108. The second token may be detectable based on a second signal conveying information associated with the second token. The information associated with the second token conveyed by the second signal may be devoid of virtual space content. The virtual space modification module 120 may be configured to effectuate a second modification within the instance of the virtual space responsive to detection of the second token. The second modification may be observable via multiple ones of client computing platforms 106 including the first client computing platform and the second computing platform.

In some implementations, two or more components of system 100 (e.g., virtual space platform(s) 102, server(s) 104, client computing platform(s) 106, token reader 110, and/or external resources 122) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which two or more components of system 100 may be operatively linked via some other communication media.

A given server 104 may include one or more processors configured to execute computer program modules. The computer program modules may be configured to enable an expert or user associated with the given server 104 to interface with system 100 and/or external resources 122, and/or provide other functionality attributed herein to server(s) 104.

A given client computing platform 106 may include one or more processors configured to execute computer program modules. The computer program modules may be configured to enable an expert or user associated with the given client computing platform 106 to interface with system 100 and/or external resources 122, and/or provide other functionality attributed herein to client computing platform(s) 106. By way of non-limiting example, the given client computing platform 106 may include one or more of a desktop computer, a laptop computer, a handheld computer, a NetBook, a Smartphone, a gaming console, and/or other computing platforms.

The external resources 122 may include sources of information, hosts and/or providers of virtual environments outside of system 100, external entities participating with system 100, and/or other resources. In some implementations, some or all of the functionality attributed herein to external resources 122 may be provided by resources included in system 100.

The virtual space platform(s) 102 may include electronic storage 124, one or more processors 126, and/or other components. The virtual space platform(s) 102 may include communication lines, or ports to enable the exchange of information with a network and/or other computing platforms. Illustration of virtual space platform(s) 102 in FIG. 1 is not intended to be limiting. The virtual space platform(s) 102 may include a plurality of hardware, software, and/or firmware components operating together to provide the functionality attributed herein to virtual space platform(s) 102. For example, virtual space platform(s) 102 may be implemented by a cloud of computing platforms operating together as virtual space platform(s) 102.

Electronic storage 124 may comprise electronic storage media that electronically stores information. The electronic storage media of electronic storage 124 may include one or both of system storage that is provided integrally (i.e., substantially non-removable) with virtual space platform(s) 102 and/or removable storage that is removably connectable to virtual space platform(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 124 may include one or more virtual storage resources (e.g., cloud storage, a virtual private network, and/or other virtual storage resources). Electronic storage 124 may store software algorithms, information determined by processor(s) 126, information received from one or more other components of system 100, and/or other information that enables virtual space platform(s) 102 to function as described herein.

The processor(s) 126 may be configured to provide information processing capabilities in virtual space platform(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. The processor(s) 126 may be configured to execute modules 114, 116, 118, 120, and/or other modules. The processor(s) 126 may be configured to execute modules 114, 116, 118, 120, and/or other modules by software; hardware; firmware; some combination of software, hardware, and/or firmware; and/or other mechanisms for configuring processing capabilities on processor(s) 126.

It should be appreciated that although modules 114, 116, 118, and 120 are illustrated in FIG. 1 as being co-located within a single processing unit, in implementations in which processor(s) 126 includes multiple processing units, one or more of modules 114, 116, 118, and/or 120 may be located remotely from the other modules. The description of the functionality provided by the different modules 114, 116, 118, and/or 120 described herein is for illustrative purposes, and is not intended to be limiting, as any of modules 114, 116, 118, and/or 120 may provide more or less functionality than is described. For example, one or more of modules 114, 116, 118, and/or 120 may be eliminated, and some or all of its functionality may be provided by other ones of modules 114, 116, 118, and/or 120. As another example, processor(s) 126 may be configured to execute one or more additional modules that may perform some or all of the functionality attributed below to one of modules 114, 116, 118, and/or 120.

Figure 2:
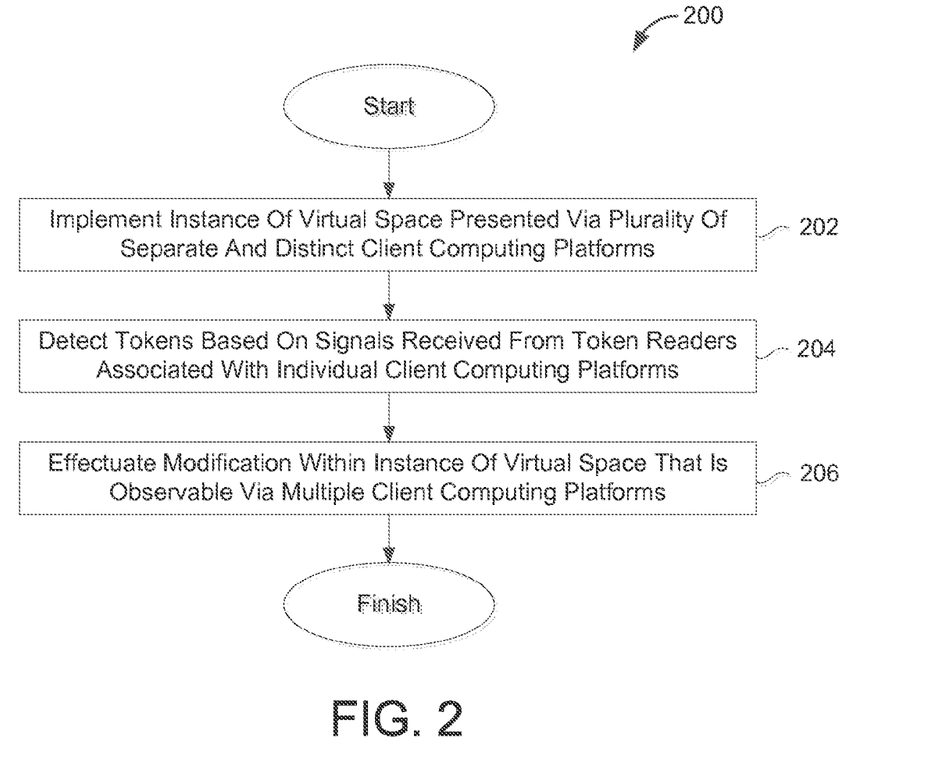
FIG. 2 illustrates a method for effectuating modifications within an instance of a virtual space presented via multiple disparate client computing platforms responsive to detection of a token associated with a single client computing platform, in accordance with one or more implementations.

FIG. 2 illustrates a method 200 for effectuating modifications within an instance of a virtual space presented via multiple disparate client computing platforms responsive to detection of a token associated with a single client computing platform, in accordance with one or more implementations. The operations of method 200 presented below are intended to be illustrative. In some embodiments, method 200 may be accomplished with one or more additional operations not described, and/or without one or more of the operations discussed. Additionally, the order in which the operations of method 200 are respectively illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a virtual space may be implemented to determine views of the virtual space. The instance of the virtual space may be presented via a plurality of separate and distinct client computing platforms. The plurality of client computing platforms may include a first client computing platform. Operation 202 may be performed by one or more processors configured to execute a space module that is the same as or similar to space module 116, in accordance with one or more implementations.

At an operation 204, one or more tokens may be detected based on signals received from token readers associated with individual ones of the plurality of client computing platforms. A given token may be a standalone physical object. The tokens may include a first token associated with the first client computing platform. The first token may be detectable based on a first signal conveying information associated with the first token. The information associated with the first token conveyed by the first signal may be devoid of virtual space content. Operation 204 may be performed by one or more processors configured to execute a token detection module that is the same as or similar to token detection module 118, in accordance with one or more implementations.

At an operation 206, a modification may be effectuated within the instance of the virtual space responsive to detection of the first token. The first modification may be observable via multiple ones of the plurality client computing platforms. Operation 206 may be performed by one or more processors configured to execute a virtual space modification module that is the same as or similar to virtual space modification module 120, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to effectuate modifications within an instance of a virtual space presented via multiple disparate client computing platforms responsive to detection of a token associated with a single client computing platform, the system comprising:
   one or more hardware processors configured by computer readable instructions to:
   implement the instance of the virtual space to determine views of the virtual space, the instance of the virtual space being presented via a plurality of separate and distinct client computing platforms, the plurality of client computing platforms including a first client computing platform;
   detect tokens based on signals received from token readers associated with individual ones of the plurality of client computing platforms, a given token being a standalone physical object, the tokens including a first token associated with the first client computing platform, the first token being detectable based on a first signal conveying information associated with the first token, the information associated with the first token conveyed by the first signal being devoid of virtual space content; and
   effectuate a first modification within the instance of the virtual space responsive to detection of the first token, the first modification being observable via multiple ones of the plurality client computing platforms, the first modification including a modification to a first character within the virtual space;
   wherein the modification to the first character includes a modification to one or more of a behavior of the first character, an ability of the first character, an appearance of the first character, or a relationship of the first character.

2. A system configured to effectuate modifications within an instance of a virtual space presented via multiple disparate client computing platforms responsive to detection of a token associated with a single client computing platform, the system comprising:
   one or more hardware processors configured by computer readable instructions to:
   implement the instance of the virtual space to determine views of the virtual space, the instance of the virtual space being presented via a plurality of separate and distinct client computing platforms, the plurality of client computing platforms including a first client computing platform;
   detect tokens based on signals received from token readers associated with individual ones of the plurality of client computing platforms, a given token being a standalone physical object, the tokens including a first token associated with the first client computing platform, the first token being detectable based on a first signal conveying information associated with the first token, the information associated with the first token conveyed by the first signal being devoid of virtual space content; and
   effectuate a first modification within the instance of the virtual space responsive to detection of the first token, the first modification being observable via multiple ones of the plurality client computing platforms, the first modification including a modification to a modification to a first virtual item within the virtual space;
   wherein the modification to the first virtual item includes a modification to one or more of a function of the first virtual item, an effectiveness of the first virtual item, or an appearance of the first virtual item.

3. The system of claim 1, wherein the first token is configured to be removably attached to a first physical accessory, and wherein the first token must be attached to the first physical accessory for the modification within the instance of the virtual space to be effectuated.

4. The system of claim 1, wherein detection of the first token in combination with detection of one or more other tokens associated with the first client computing platform effectuates another modification within the instance of the virtual space.

5. The system of claim 1, wherein:
   the plurality of client computing platforms further include a second client computing platform;
   the tokens further include a second token associated with the second client computing platform, the second token being detectable based on a second signal conveying information associated with the second token, the information associated with the second token conveyed by the second signal being devoid of virtual space content; and
   the one or more hardware processors are further configured by computer readable instructions to effectuate a second modification within the instance of the virtual space responsive to detection of the second token, the second modification being observable via multiple ones of the plurality client computing platforms including the first client computing platform and the second computing platform.

6. The system of claim 5, wherein the first computing platform is a stationary computing platform and the second computing platform is a mobile computing platform.

7. A system configured to effectuate modifications within an instance of a virtual space presented via multiple disparate client computing platforms responsive to detection of a token associated with a single client computing platform, the system comprising:
   one or more hardware processors configured by computer readable instructions to:
   implement the instance of the virtual space to determine views of the virtual space, the instance of the virtual space being presented via a plurality of separate and distinct client computing platforms, the plurality of client computing platforms including a first client computing platform;
   detect tokens based on signals received from token readers associated with individual ones of the plurality of client computing platforms, a given token being a standalone physical object, the tokens including a first token associated with the first client computing platform, the first token being detectable based on a first signal conveying information associated with the first token, the information associated with the first token conveyed by the first signal being devoid of virtual space content; and effectuate a first modification within the instance of the virtual space responsive to detection of the first token, the first modification being observable via multiple ones of the plurality client computing platforms, the first modification including a modification to an objective associated with the virtual space, the objective being a purpose or goal that efforts or actions within the virtual space are intended to attain or accomplish.

8. A system configured to effectuate modifications within an instance of a virtual space presented via multiple disparate client computing platforms responsive to detection of a token associated with a single client computing platform, the system comprising:

one or more hardware processors configured by computer readable instructions to:

implement the instance of the virtual space to determine views of the virtual space, the instance of the virtual space being presented via a plurality of separate and distinct client computing platforms, the plurality of client computing platforms including a first client computing platform;

detect tokens based on signals received from token readers associated with individual ones of the plurality of client computing platforms, a given token being a standalone physical object, the tokens including a first token associated with the first client computing platform, the first token being detectable based on a first signal conveying information associated with the first token, the information associated with the first token conveyed by the first signal being devoid of virtual space content; and effectuate a first modification within the instance of the virtual space responsive to detection of the first token, the first modification being observable via multiple ones of the plurality client computing platforms, the first modification including a modification to a theme of the virtual space, the theme of the virtual space being a unifying subject associated with the virtual space.

9. A computer-implemented method for effectuating modifications within an instance of a virtual space presented via multiple disparate client computing platforms responsive to detection of a token associated with a single client computing platform, the method being performed by one or more hardware processors configured by computer readable instructions, the method comprising:

implementing, at one or more hardware processors, the instance of the virtual space to determine views of the virtual space, the instance of the virtual space being presented via a plurality of separate and distinct client computing platforms, the plurality of client computing platforms including a first client computing platform;

detecting, at one or more hardware processors, tokens based on signals received from token readers associated with individual ones of the plurality of client computing platforms, a given token being a standalone physical object, the tokens including a first token associated with the first client computing platform, the first token being detectable based on a first signal conveying information associated with the first token, the information associated with the first token conveyed by the first signal being devoid of virtual space content; and effectuating, at one or more hardware processors, a first modification within the instance of the virtual space responsive to detection of the first token, the first modification being observable via multiple ones of the plurality client computing platforms, the first modification including a modification to a first character within the virtual space;

wherein the modification to the first character includes a modification to one or more of a behavior of the first character, an ability of the first character, an appearance of the first character, or a relationship of the first character.

10. A computer-implemented method for effectuating modifications within an instance of a virtual space presented via multiple disparate client computing platforms responsive to detection of a token associated with a single client computing platform, the method being performed by one or more hardware processors configured by computer readable instructions, the method comprising:

implementing, at one or more hardware processors, the instance of the virtual space to determine views of the virtual space, the instance of the virtual space being presented via a plurality of separate and distinct client computing platforms, the plurality of client computing platforms including a first client computing platform;

detecting, at one or more hardware processors, tokens based on signals received from token readers associated with individual ones of the plurality of client computing platforms, a given token being a standalone physical object, the tokens including a first token associated with the first client computing platform, the first token being detectable based on a first signal conveying information associated with the first token, the information associated with the first token conveyed by the first signal being devoid of virtual space content; and effectuating, at one or more hardware processors, a first modification within the instance of the virtual space responsive to detection of the first token, the first modification being observable via multiple ones of the plurality client computing platforms, the first modification including a modification to a first virtual item within the virtual space;

wherein the modification to the first virtual item includes a modification to one or more of a function of the first virtual item, an effectiveness of the first virtual item, or an appearance of the first virtual item.

11. The method of claim 9, wherein the first token is configured to be removably attached to a first physical accessory, and wherein the first token must be attached to the first physical accessory for the modification within the instance of the virtual space to be effectuated.

12. The method of claim 9, further comprising effectuating another modification within the instance of the virtual space responsive to detection of the first token in combination with detection of one or more other tokens associated with the first client computing platform.

13. The method of claim 9, wherein:

the plurality of client computing platforms further include a second client computing platform;

the tokens further include a second token associated with the second client computing platform, the second token being detectable based on a second signal conveying information associated with the second token, the information associated with the second token conveyed by the second signal being devoid of virtual space content; and the method further comprises effectuating a second modification within the instance of the virtual space responsive to detection of the second token, the second modification being observable via multiple ones of the plurality client computing platforms including the first client computing platform and the second computing platform.

14. The method of claim 13, wherein the first computing platform is a stationary computing platform and the second computing platform is a mobile computing platform.

15. A computer-implemented method for effectuating modifications within an instance of a virtual space presented via multiple disparate client computing platforms responsive to detection of a token associated with a single client computing platform, the method being performed by one or more hardware processors configured by computer readable instructions, the method comprising:

implementing, at one or more hardware processors, the instance of the virtual space to determine views of the virtual space, the instance of the virtual space being presented via a plurality of separate and distinct client computing platforms, the plurality of client computing platforms including a first client computing platform;

detecting, at one or more hardware processors, tokens based on signals received from token readers associated with individual ones of the plurality of client computing platforms, a given token being a standalone physical object, the tokens including a first token associated with the first client computing platform, the first token being detectable based on a first signal conveying information associated with the first token, the information associated with the first token conveyed by the first signal being devoid of virtual space content; and effectuating, at one or more hardware processors, a first modification within the instance of the virtual space responsive to detection of the first token, the first modification being observable via multiple ones of the plurality client computing platforms, the first modification including a modification to an objective associated with the virtual space, the objective being a purpose or goal that efforts or actions within the virtual space are intended to attain or accomplish.

16. A computer-implemented method for effectuating modifications within an instance of a virtual space presented via multiple disparate client computing platforms responsive to detection of a token associated with a single client computing platform, the method being performed by one or more hardware processors configured by computer readable instructions, the method comprising:

implementing, at one or more hardware processors, the instance of the virtual space to determine views of the virtual space, the instance of the virtual space being presented via a plurality of separate and distinct client computing platforms, the plurality of client computing platforms including a first client computing platform;

detecting, at one or more hardware processors, tokens based on signals received from token readers associated with individual ones of the plurality of client computing platforms, a given token being a standalone physical object, the tokens including a first token associated with the first client computing platform, the first token being detectable based on a first signal conveying information associated with the first token, the information associated with the first token conveyed by the first signal being devoid of virtual space content; and effectuating, at one or more hardware processors, a first modification within the instance of the virtual space responsive to detection of the first token, the first modification being observable via multiple ones of the plurality client computing platforms, the first modification including a modification to a theme of the virtual space, the theme of the virtual space being a unifying subject associated with the virtual space.

* * * * *